United States Patent
Fan et al.

(10) Patent No.: US 10,388,007 B2
(45) Date of Patent: Aug. 20, 2019

(54) IMAGE PROCESSING METHOD AND IMAGE PROCESSING DEVICE

(71) Applicant: MStar Semiconductor, Inc., Hsinchu Hsien (TW)

(72) Inventors: Hao-Teng Fan, Zhubei (TW); Chiao Su, Zhubei (TW)

(73) Assignee: XIAMEN SIGMASTAR TECHNOLOGY LTD, Shamen, Fujian (CN)

( * ) Notice: Subject to any disclaimer, the term of this patent is extended or adjusted under 35 U.S.C. 154(b) by 85 days.

(21) Appl. No.: 15/641,645

(22) Filed: Jul. 5, 2017

(65) Prior Publication Data
US 2018/0286026 A1    Oct. 4, 2018

(30) Foreign Application Priority Data
Mar. 31, 2017    (TW) .............................. 106110946 A (51) Int. Cl.
*G06K 9/36*        (2006.01)
*G06T 5/50*        (2006.01)
*G06T 3/60*        (2006.01)

(52) U.S. Cl.
CPC ................. *G06T 5/50* (2013.01); *G06T 3/60* (2013.01); *G06T 2207/20221* (2013.01)

(58) Field of Classification Search
CPC ... G06T 15/205; G06T 7/0051; G06T 7/0065; G06T 7/0077; G06T 7/0075; G06T 5/005; G06T 2207/10028; G06T 2207/10024; G06T 3/4038; G06T 11/60; H04N 1/3876; H04N 5/23238; G06K 2009/2045
USPC ................................................. 382/154, 284
See application file for complete search history.

(56) References Cited

U.S. PATENT DOCUMENTS

| 6,337,683 B1 | 1/2002 | Gilbert et al. |
| 8,818,101 B1 * | 8/2014 | Lim .......................... G06T 7/33 345/629 |

OTHER PUBLICATIONS

TIPO Office Action, dated Oct. 3, 2018, 5 pages.

* cited by examiner

*Primary Examiner* — Duy M Dang
(74) *Attorney, Agent, or Firm* — Edell, Shapiro & Finnan, LLC (57) ABSTRACT

An image processing method includes: performing an equirectangular projection on a first fisheye image and a second fisheye image to obtain a first equirectangular image and a second equirectangular image; swapping positions of a left-half image of the second equirectangular image and a right-half image of the second equirectangular image to obtain a third equirectangular image; rotating the first equirectangular image and the third equirectangular image by 90 degrees in a spherical coordinate system to obtain a first rotated image and a second rotated image; stitching the first rotated image and the second rotated image to obtain a stitched image; and rotating the stitched image by −90 degrees in the spherical coordinate system to obtain a panoramic image.

10 Claims, 10 Drawing Sheets

IMAGE PROCESSING METHOD AND IMAGE PROCESSING DEVICE

This application claims the benefit of Taiwan application Serial No. 106110946, filed on Mar. 31, 2017, the subject matter of which is incorporated herein by reference.

BACKGROUND OF THE INVENTION

Field of the Invention

The invention relates in general to an image processing method and an image processing device, and more particularly to a fisheye image processing method and a fisheye image processing device.

Description of the Related Art

With the progressive development of image technologies, various image capturing devices are continuously innovated. Viewing angles of some fisheye lenses may even exceed 180 degrees. By stitching two fisheye images respectively captured by a front fisheye lens and a rear fisheye lens both having a viewing angle greater than 180 degrees, a panoramic image is generated.

Figure 1:
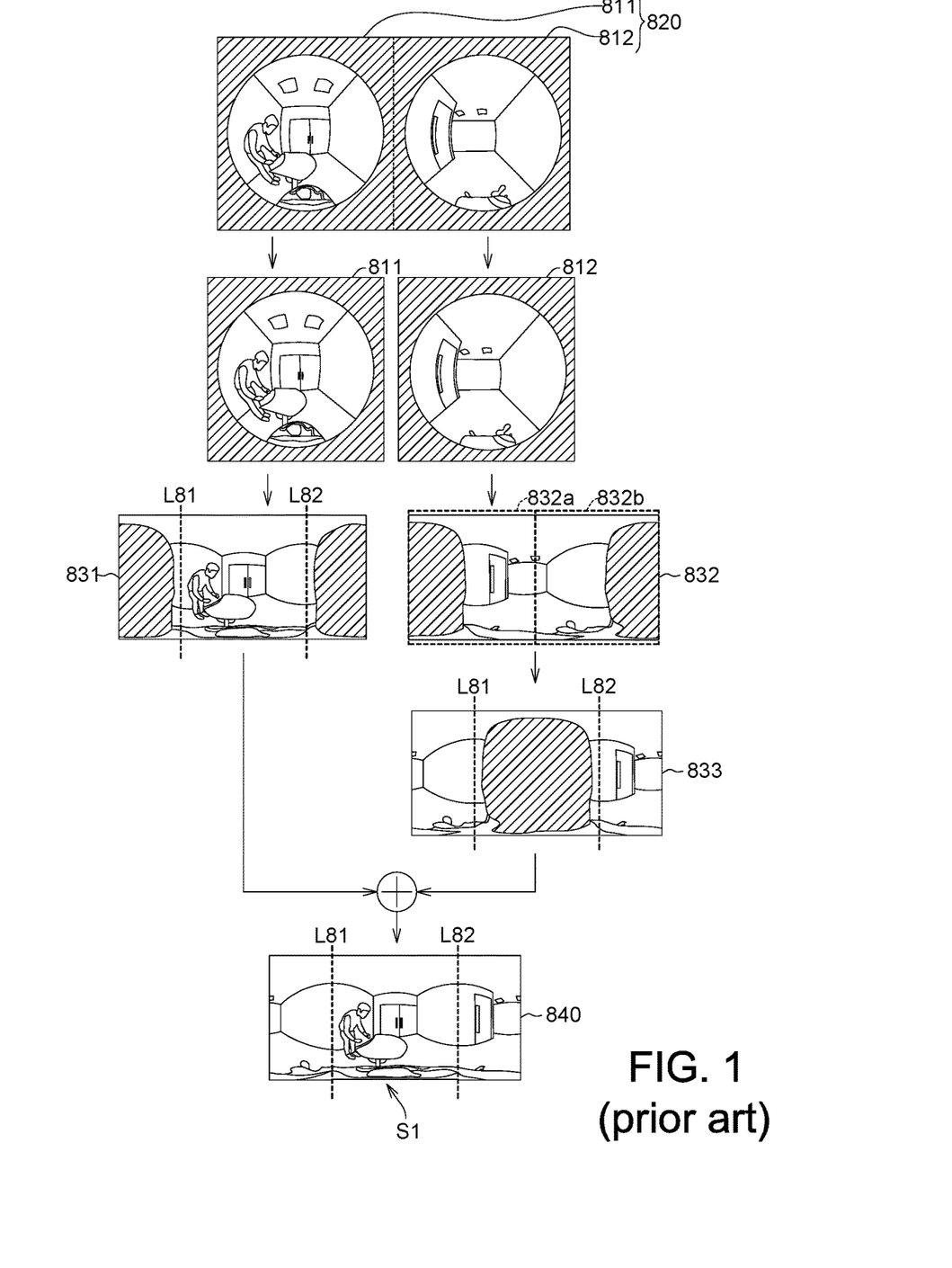
FIG. 1(prior art) is a schematic diagram of a conventional image processing method.

FIG. 1 shows a schematic diagram of a conventional image process method. First, an image processing unit receives a merged image 820 formed by combining two fisheye images 811 and 812 respectively generated by a front fisheye lens and a rear fisheye lens both having a viewing angle greater than 180 degrees. The image processing unit divides the merged image 820 into fisheye images 811 and 812, performs an equirectangular projection on the fisheye images 811 and 812 to obtain equirectangular images 831 and 832. The image processing unit further swaps positions of a left-half image 832a and a right-half image 832b of the equirectangular image 832 to obtain another equirectangular image 833. Next, the image processing unit stitches the equirectangular image 831 and the equirectangular image 833 along a first stitch line L81 and a second stitch line L82 to obtain a panoramic image 840.

Figure 2:
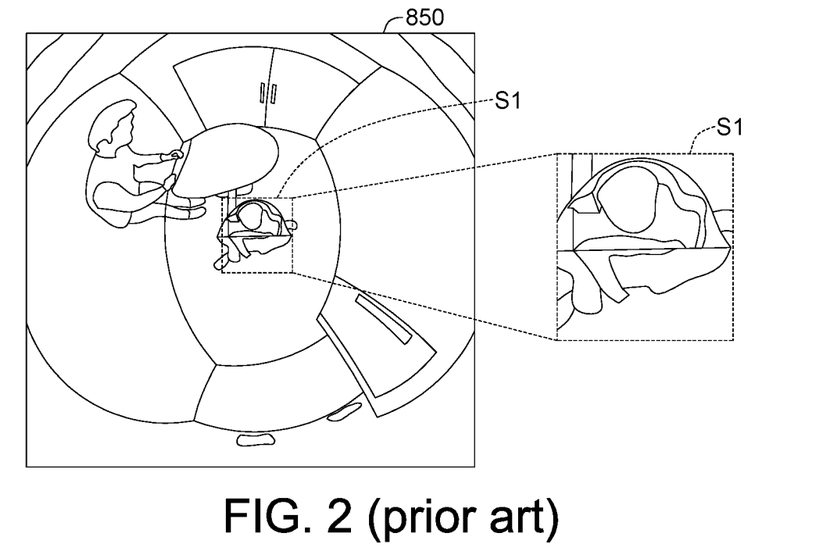
FIG. 2 (prior art) is a panoramic spherical image converted from the panoramic image in FIG. 1.

FIG. 2 shows a panoramic spherical image 850 obtained from converting the panoramic image 840 in FIG. 1. In FIG. 2, an enlarged view of the panoramic image 850 corresponds to a seam S1 of the panoramic image 840 located at a high altitude. However, as shown in FIG. 2, in the panoramic spherical image 850, noticeable discontinuity exists at the seam S1, which severely affects the image quality.

SUMMARY OF THE INVENTION

The invention is directed to an image processing method and an image processing device for solving the above issues.

According to an aspect of the present invention, an image processing method is provided. The image processing method includes: performing an equirectangular projection on a first fisheye image and a second fisheye image to obtain a first equirectangular image and a second equirectangular image; swapping positions of a left-half image of the second equirectangular image and a right-half image of the second equirectangular image to obtain a third equirectangular image; rotating the first equirectangular image and the third equirectangular image by 90 degrees in a spherical coordinate system to obtain a first rotated image and a second rotated image; stitching the first rotated image and the second rotated image to obtain a stitched image; and rotating the stitched image by −90 degrees in the spherical coordinate system to obtain a panoramic image.

According to another aspect of the present invention, an image processing device is provided. The image processing device includes an equirectangular projection unit, a swapping unit, a rotation unit, a stitching unit and a reverse rotation unit. The equirectangular projection unit performs an equirectangular projection on a first fisheye image and a second fisheye image to obtain a first equirectangular image and a second equirectangular image. The swapping unit swaps positions of a left-half image of the second equirectangular and a right-half image of the second equirectangular image to obtain a third equirectangular image. The rotation unit rotates the first equirectangular image and the third equirectangular image by 90 degrees in a spherical coordinate system to obtain a first rotated image and a second rotated image. The stitching unit stitches the first rotated image and the second rotated image to obtain a stitched image. The reverse rotation unit rotates the stitched image by −90 degrees to obtain a panoramic image.

The above and other aspects of the invention will become better understood with regard to the following detailed description of the non-limiting embodiments. The following description is made with reference to the accompanying drawings.

DETAILED DESCRIPTION OF THE INVENTION

In the present invention, fisheye images are first rotated by 90 degrees and then stitched, so that a seam at a high altitude in a panoramic image does not present noticeable discontinuity to effectively enhance image quality.

Figure 3:
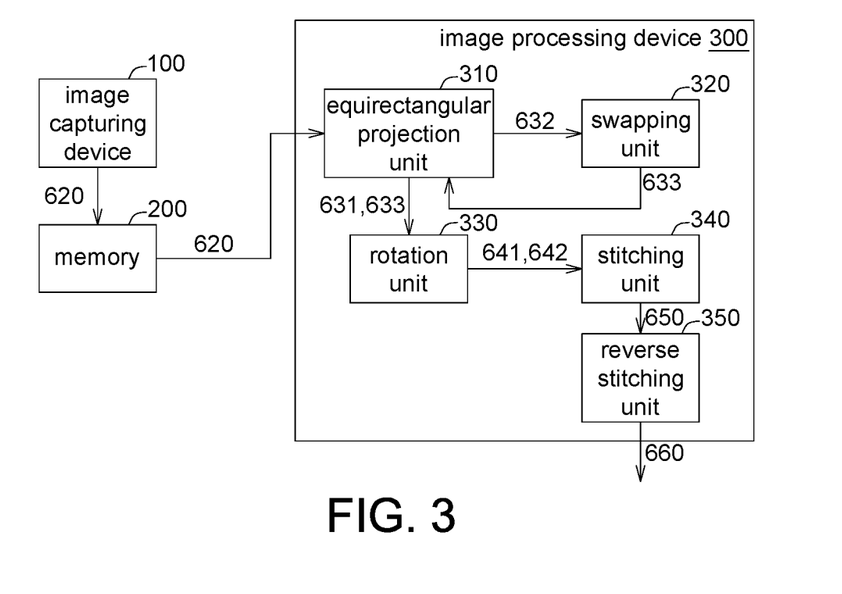
FIG. 3 is a block diagram of an image processing device according to an embodiment of the present invention.
Figure 4:
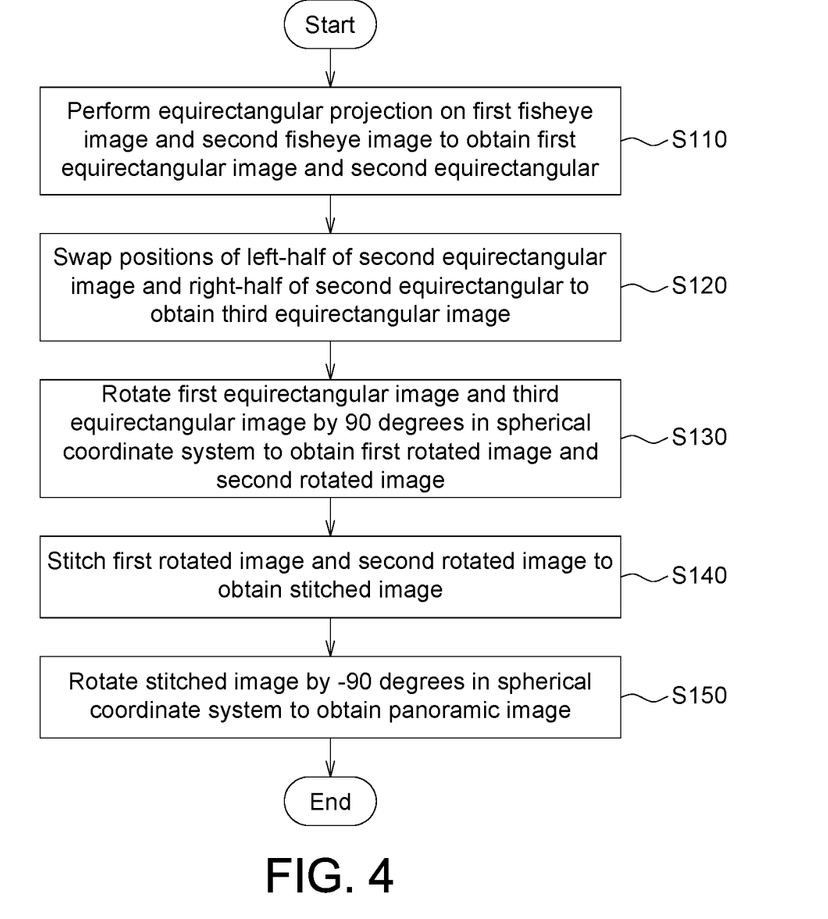
FIG. 4 is a flowchart of an image processing method according to an embodiment of the present invention.
Figure 5A:
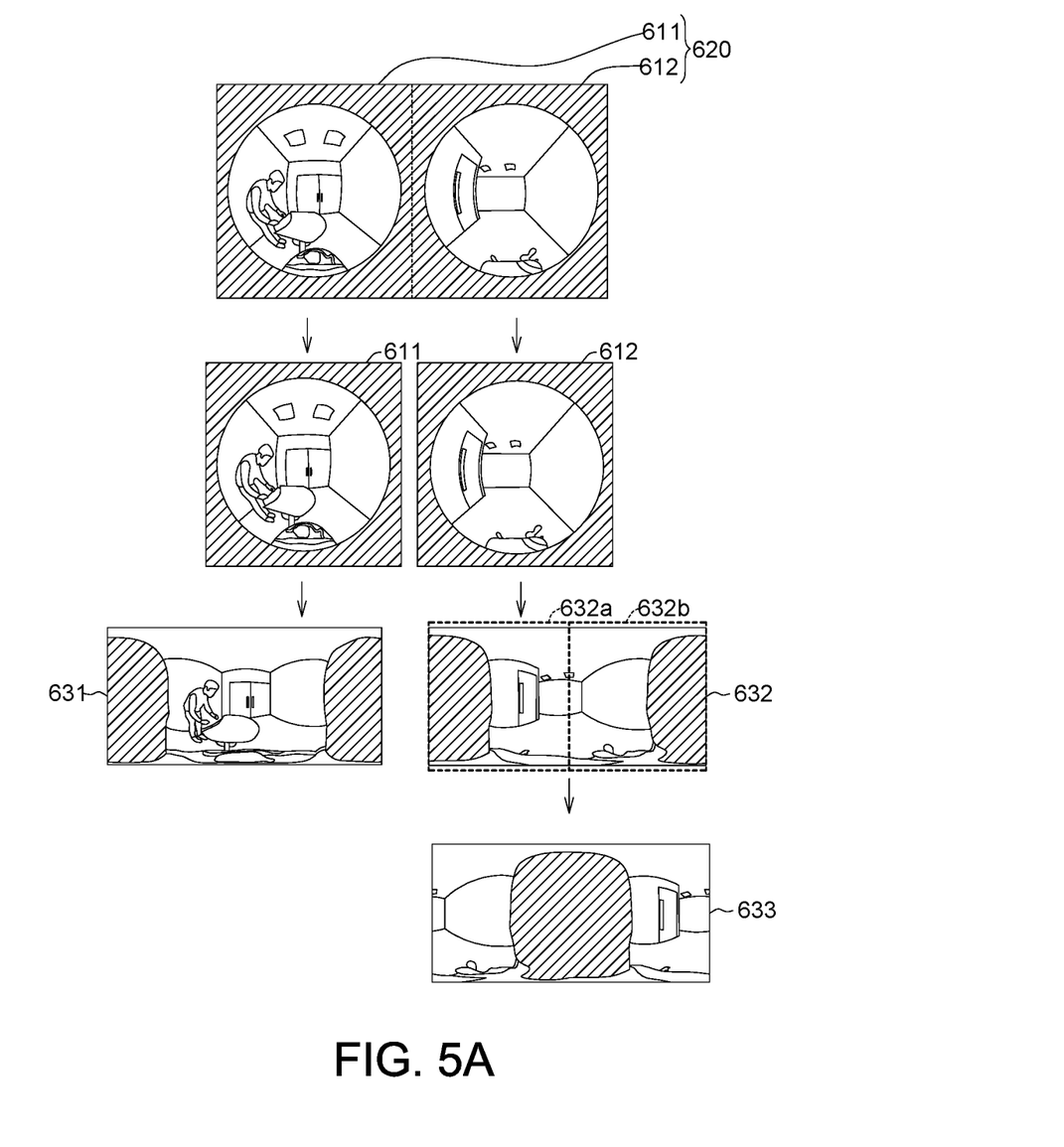
FIG. 5A and FIG. 5B are schematic diagrams of the steps in FIG. 4.
Figure 5B:
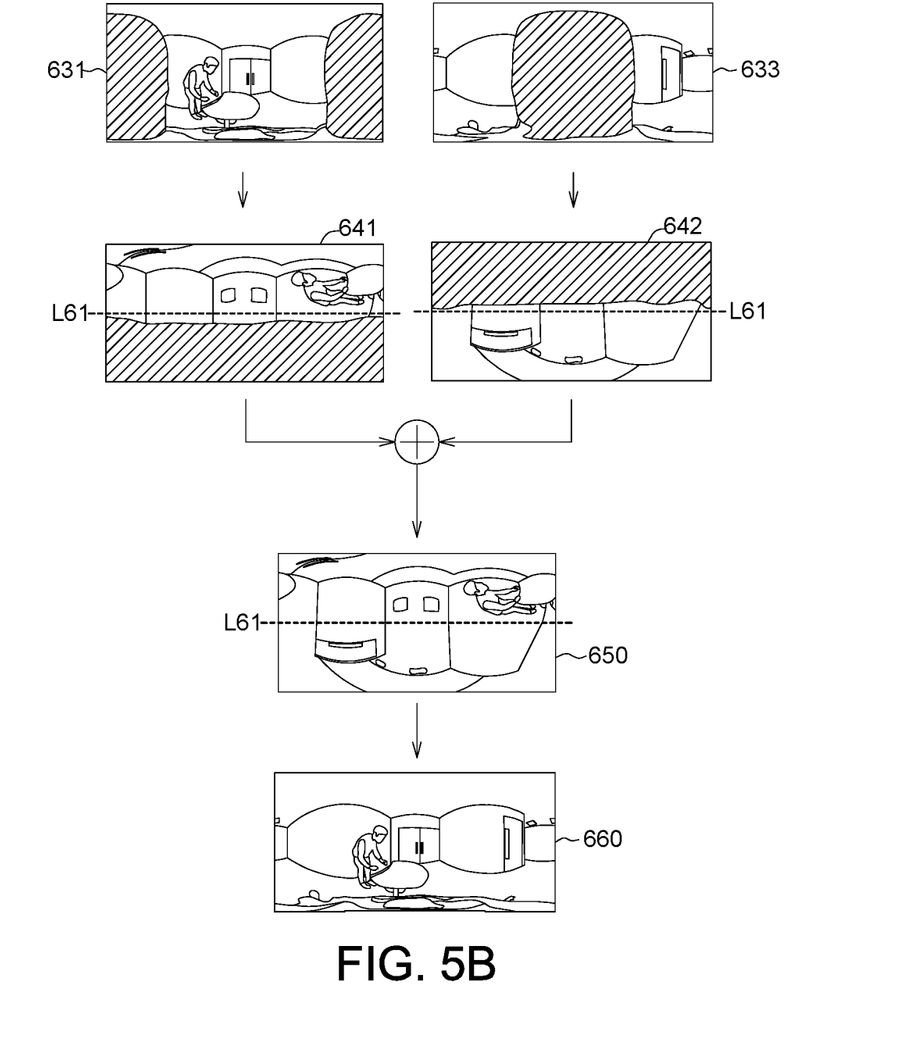

FIG. 3 shows a block diagram of an image processing device 300 according to an embodiment of the present invention. FIG. 4 shows a flowchart of an image processing method according to an embodiment of the present invention. FIG. 5A and FIG. 5B are schematic diagrams of the steps in FIG. 4. The image processing method of the present invention is not limited to the flowchart in FIG. 4. Further, a part of the steps may be simultaneously performed, or orders for performing the steps may be changed.

The image processing device 300 includes an equirectangular projection unit 310, a swapping unit 320, a rotation unit 330, a stitching unit 340 and a reverse rotation unit 350. Each of the equirectangular projection unit 310, the swapping unit 320, the rotation unit 330, the stitching unit 340 and the reverse rotation unit 350 is, for example, a chip, a circuit, a circuit board or a processor incorporating with multiple program codes.

In step S110, as shown in FIG. 5A, in one embodiment, the equirectangular projection unit 310 performs an equirectangular projection on a first fisheye diagram 611 and a second fisheye diagram 612 to obtain a first equirectangular image 631 and a second equirectangular image 632. The first fisheye diagram 631 and the second fisheye diagram 632 may be obtained from dividing a combined image 620. The combined image 620 may be provided by an image capturing device 100 and stored in a memory 200. In another embodiment, the equirectangular projection unit 310 may also directly receive the first fisheye image 611 and the second fisheye image 612 from different fisheye lenses.

In step S120, the swapping unit 320 swaps a left-half image 632a and a right-half image 632b of the second equirectangular image 632 to obtain a third equirectangular image 633.

Figure 6:
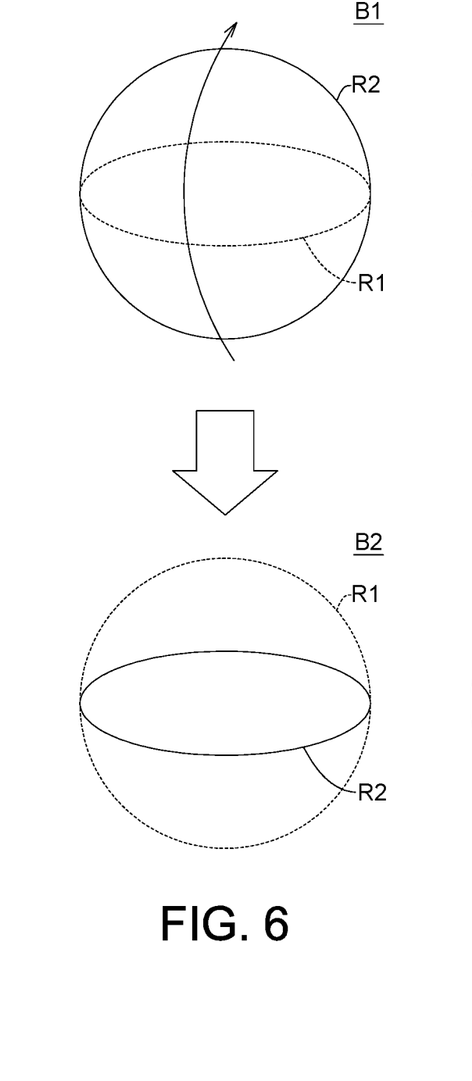
FIG. 6 is a schematic diagram of rotating by 90 degrees in a spherical coordinate system according to an embodiment of the present invention.

In step S130, as shown in FIG. 5B, the first equirectangular image 631 and the third equirectangular image 633 are rotated by 90 degrees in a spherical coordinate system to obtain a first rotated image 641 and a second rotated image 642. FIG. 6 shows a schematic diagram of 90-degree rotation in a spherical coordinate system. Assume that the first equirectangular image 631 corresponds to a first spherical image B1. A dotted line R1 of the first spherical image B1 is the equator, and a solid line R2 forming a 90-degree angle with the dotted line R1 is a longitudinal line. After rotating by 90 degrees in a spherical coordinate system, the dotted line R1 is rotated to the original position of the solid line R2, and the solid line R2 is rotated to the original position of the dotted line R1, to form a second spherical image B2 corresponding to the first rotated image 641.

In step S140, the stitching unit 340 stitches the first rotated image 641 and the second rotated image 642 along a stitch line L61 to obtain a stitched image 650. More specifically, the stitch line L61 is a long central axis of the stitched image 650 and parallel to long sides of the stitched image 650, and passes the center of the stitched image 650. It is thus known that, there is only one stitch line in the present invention, and so the processing speed can be accelerated.

Figure 7:
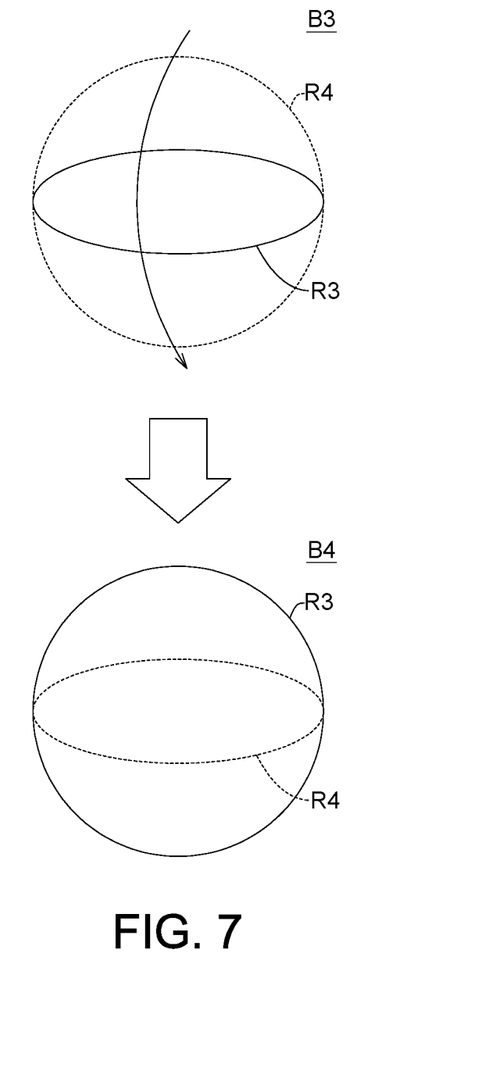
FIG. 7 is a schematic diagram of rotating by −90 degrees in a spherical coordinate system according to an embodiment of the present invention.

In step S150, the reverse rotation unit 350 rotates the stitched image 650 by −90 degrees in a spherical coordinate system to obtain a panoramic image 660. FIG. 7 shows a schematic diagram of rotating by −90 degrees in a spherical coordinate system. Assume that the stitched image 650 corresponds to a third spherical image B3. A dotted line R3 of the third spherical image B3 is the equator, and a dotted line R4 forming a 90-degree angle with the solid line R3 is a longitudinal line. After rotating by −90 degrees in a spherical coordinate system, the solid line R3 is rotated to the original position of the dotted line R4, and the dotted line R4 is rotated to the original position of the solid line R3, to obtain a fourth spherical image B4 corresponding to the panoramic image 660.

It should be noted that, in the above embodiments, rotating by 90 degrees in a spherical coordinate system is rotating the dotted line R1 upwards by 90 degrees, and rotating by −90 degrees in a spherical coordinate system is rotating the solid line R3 downwards by 90 degrees. In another embodiment, rotating by 90 degrees in a spherical coordinate system may also be rotating the dotted line R1 downwards by 90 degrees, and rotating by −90 degrees in a spherical coordinate system may be rotating the solid line R3 upwards by 90 degrees. In other words, rotating by 90 degrees and −90 degrees in a spherical coordinate system means that the rotation direction in step S150 is opposite to the rotation direction in step S130.

Figure 8:
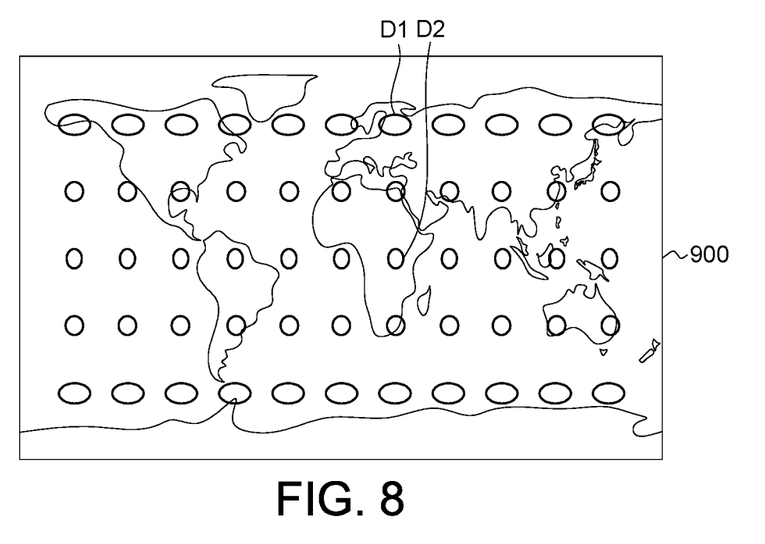
FIG. 8 shows image stretching in an equirectangular projection process.
Figure 9:
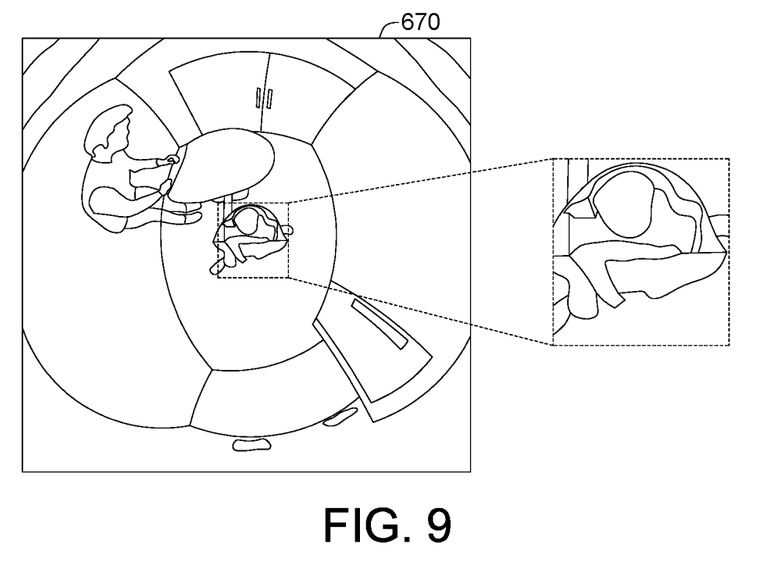
FIG. 9 is a panoramic spherical image obtained from converting the panoramic image in FIG. 5B.

FIG. 8 shows image stretching in an equirectangular projection process. It is discovered by the Applicant that, during an equirectangular projection process, in an equirectangular image 900, the distortion level at a high altitude region D1 is much more significant than that at a low altitude region D2. Therefore, when a conventional solution directly stitches two equirectangular images 831 and 832 along first stitch line L81 and a second stitch line L82, a seam of the panoramic image presents noticeable discontinuity, as shown in FIG. 2. In contrast, FIG. 9 shows a panoramic spherical image 670 obtained from converting the panoramic image 660 in FIG. 5B. As shown in FIG. 9, the present invention, by first rotating the first equirectangular image 631 and the third equirectangular image 633 and then stitching them, significantly alleviates the discontinuity of a seam at a high altitude and effectively enhances the image quality.

Figure 10:
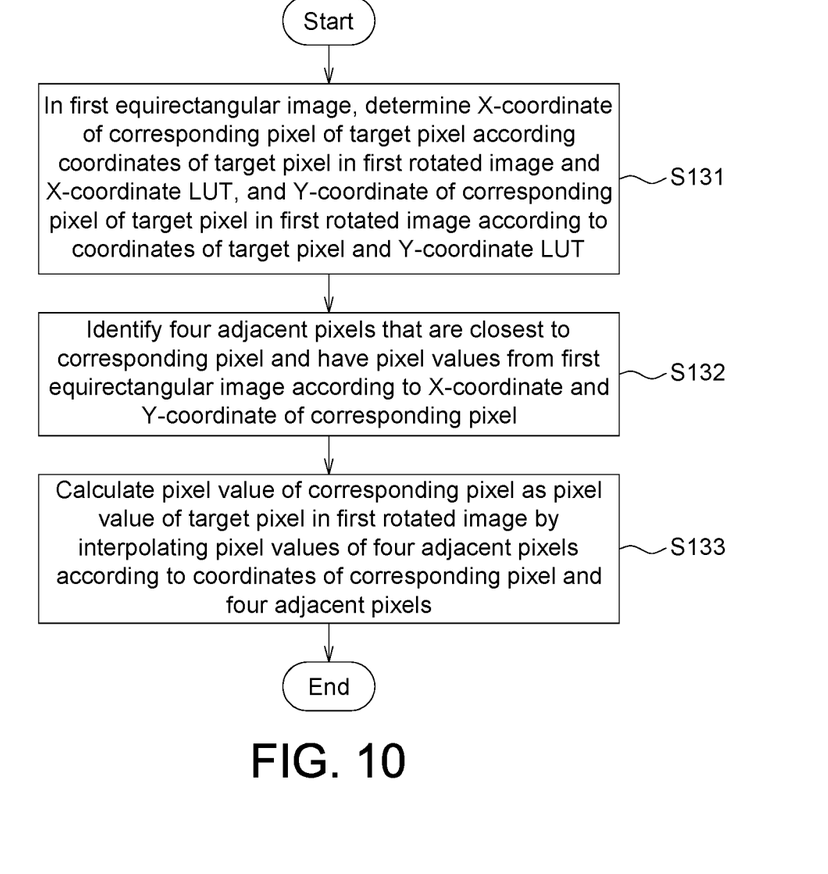
FIG. 10 is a detailed flowchart of step S130.
Figure 11:
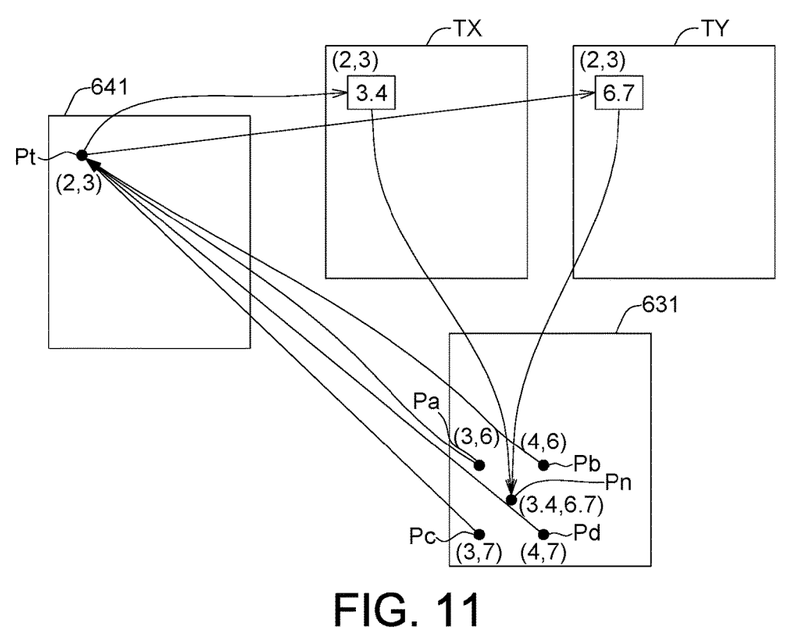
FIG. 11 is a schematic diagram of the steps in FIG. 10.

FIG. 10 shows a detailed flowchart of step S130. FIG. 11 shows a schematic diagram of the steps in FIG. 10. Step S130 of rotating by 90 degrees in a spherical coordinate system may be achieved through a look-up table (LUT) and an interpolation algorithm. For example, as shown in FIG. 11, to obtain a pixel value of a target pixel Pt located at coordinates (2, 3) in the first rotated image 641, it is identified that, in the first equirectangular image 631, the X-coordinate of a corresponding pixel Pn of the target pixel Pt is 3.4 according to the coordinates (2, 3) of the target pixel Pt and an X-coordinate LUT TX, and the Y-coordinate of the corresponding pixel Pn of the target pixel Pt is 6.7 according to the coordinates (2, 3) of the target pixel Pt and a Y-coordinate LUT TY (step S131).

According to the coordinates (3.4, 6.7) of the corresponding pixel Pn, four adjacent pixels, which are closest to the corresponding pixel Pn and have pixel values, are identified from the first equirectangular image 631. For example, a first adjacent pixel Pa having coordinates (3, 6), a second adjacent pixel Pb having coordinates (4, 6), a third adjacent pixel having coordinates (3, 7), and a fourth adjacent pixel Pd having coordinates (4, 7), are identified (step S132).

Next, according to equation (1) below, pixel values of the first, second, third and fourth adjacent pixels Pa, Pb, Pc and Pd are interpolated according to the coordinates of the first, second, third and fourth adjacent pixels Pa, Pb, Pc and Pd and the corresponding pixel Pn to calculate a pixel value of the corresponding pixel Pn, which is then used as the pixel value of the target pixel Pt in the first rotated image 641 (step S133).

$$n=(4-3.4)\times(7-6.7)\times a+(3.4-3)\times(7-6.7)\times b+(4-3.4)\times(6.7-6)\times c+(3.4-3)\times(6.7-6)\times d \qquad (1)$$

In equation (1), n is the pixel value of the corresponding pixel Pn, a is the pixel value of the first adjacent pixel Pa, b is the pixel value of the second adjacent pixel Pb, c is the pixel value of the third adjacent pixel Pc, and d is the pixel value of the fourth adjacent pixel Pd. Similarly, pixel values of all pixels in the first rotated image 641 and the second rotated image 642 may be obtained.

Figure 12:
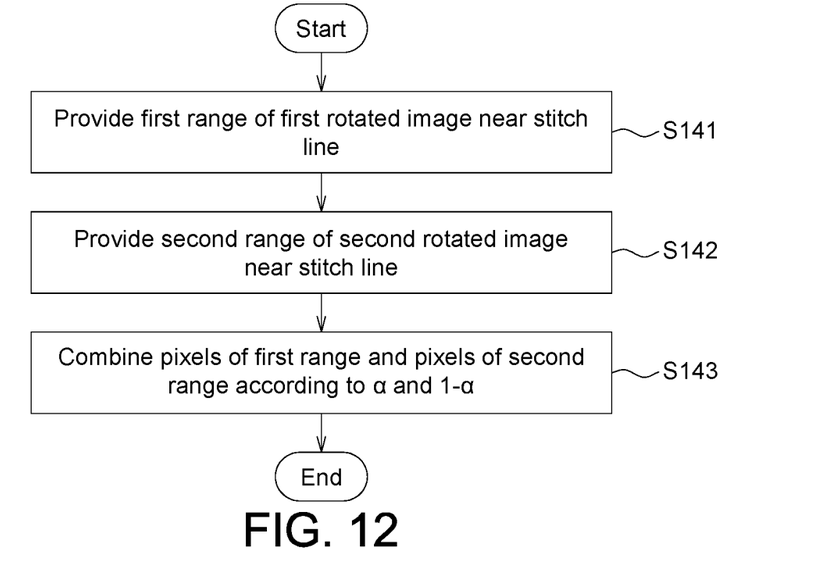
FIG. 12 is a detailed flowchart of step S140.
Figure 13:
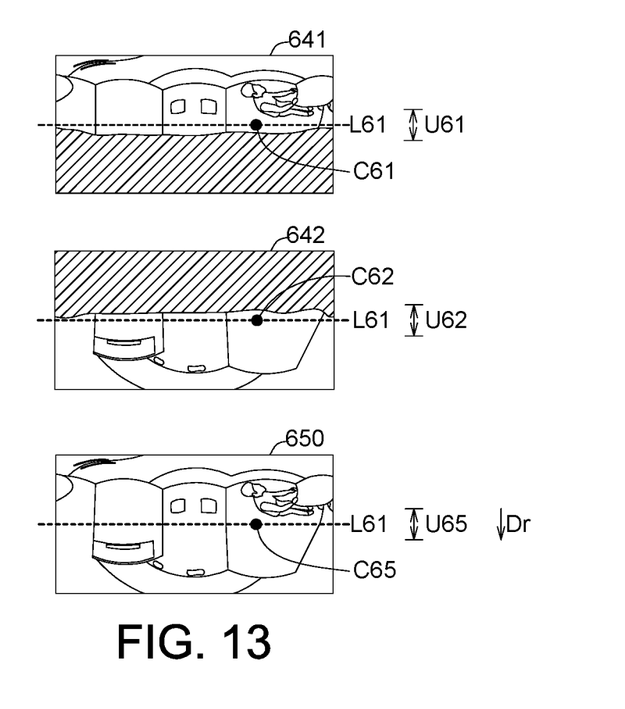
FIG. 13 is a schematic diagram of the steps in FIG. 12.

In one embodiment, step S140 may adopt an alpha (α) blending algorithm to perform stitching. FIG. 12 shows a detailed flowchart of step S140. FIG. 13 shows a schematic diagram of the steps in FIG. 12. A first range U61 of the first rotated image 641 that is near the stitch line L61 is provided (step S141), and a second range U62 of the second rotated image 642 near the stitch line L61 is provided (step S142). During the stitching process, corresponding pixels of the first range U61 and the second range U62 are respectively combined according to α and α-1 to form a blended range U65 of the stitched image 650 (step S143). For example, a blended pixel C65 of the stitched image 650 corresponds to a first pixel C61 of the first rotated image 641 and a second pixel C62 of the second rotated image 642. The pixel value of the blended pixel C65 of the stitched image 650 may be calculated according to equation (2):

$$V65=V61\times\alpha+V62\times(1-\alpha) \qquad (2)$$

In equation (2), V65 is the pixel value of the blended pixel C65, V61 is the pixel value of the first pixel C61, V62 is the pixel value of the second pixel C62, and a is a blending coefficient and is in a value between 0 and 1. Further, the blending range U65 drops from 1 to 0 along the direction Dr. Thus, in the blended range U65, the first rotated image 641 contributes more significantly as a pixel value gets closer to the upper side. In contrast, the second rotated image 642 contributes more significantly as a pixel value gets closer to the lower side. As such, the first rotated image 641 and the second rotated image 642 may be smoothly stitched.

While the invention has been described by way of example and in terms of the embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An image processing method performed by an image processing device, the method comprising:
    performing an equirectangular projection on a first fisheye image and a second fisheye image to obtain a first equirectangular image and a second equirectangular image;
    swapping positions of a left-half image of the second equirectangular image and a right-half image of the second equirectangular image to obtain a third equirectangular image;
    rotating the first equirectangular image and the third equirectangular image by 90 degrees in a spherical coordinate system to obtain a first rotated image and a second rotated image;
    stitching the first rotated image and the second rotated image to obtain a stitched image; and
    rotating the stitched image by −90 degrees in the spherical coordinate system to obtain a panoramic image.

2. The image processing method according to claim 1, wherein the step of rotating the first equirectangular image by 90 degrees in the spherical coordinate system comprises:
    identifying an X-coordinate for a corresponding pixel of a target pixel in the first equirectangular image according to coordinates for the target pixel in the first rotated image and an X-coordinate look-up table (LUT), and identifying a Y-coordinate for the corresponding pixel of the target pixel in the first equirectangular image according to the coordinates of the target pixel in the first rotated image and a Y-coordinate LUT;
    identifying four adjacent pixels that are closest to the corresponding pixel and have pixel values in the first equirectangular image according to the X-coordinate and the Y-coordinate; and
    calculating a pixel value for the corresponding pixel in the first equirectangular image as a pixel value of the target pixel in the first rotated image by interpolating the pixel values of the four adjacent pixels according to the coordinates for the corresponding pixel and the four adjacent pixels.

3. The image processing method according to claim 1, wherein in the step of stitching the first rotated image and the second rotated image, the first rotated image and the second rotated image are stitched along only one stitch line.

4. The image processing method according to claim 3, wherein the stitch line is parallel to long sides of the stitched image.

5. The image processing method according to claim 3, wherein the stitch line passes a center of the stitched image.

6. An image processing device, comprising:
    an equirectangular projection unit, performing an equirectangular projection on a first fisheye image and a second fisheye image to obtain a first equirectangular image and a second equirectangular image;
    a swapping unit, swapping positions of a left-half image of the second equirectangular image and a right-half image of the second equirectangular image to obtain a third equirectangular image;
    a rotation unit, rotating the first equirectangular image and the third equirectangular image by 90 degrees in a spherical coordinate system to obtain a first rotated image and a second rotated image;
    a stitching unit, stitching the first rotated image and the second rotated image to obtain a stitched image; and
    a reverse rotation unit, rotating the stitched image by −90 degrees in the spherical coordinate system to obtain a panoramic image.

7. The image processing device according to claim 6, wherein the rotation unit:
    identifies an X-coordinate for a corresponding pixel of a target pixel in the first equirectangular image according to coordinates for the target pixel in the first rotated image and an X-coordinate look-up table (LUT), and identifies a Y-coordinate for the corresponding pixel of the target pixel in the first equirectangular image according to the coordinates of the target pixel in the first rotated image and a Y-coordinate LUT;
    identifies four adjacent pixels that are closest to the corresponding pixel and have pixel values in the first equirectangular image according to the X-coordinate and the Y-coordinate; and
    calculates a pixel value of the corresponding pixel in the first equirectangular image as a pixel value of the target pixel in the first rotated image by interpolating the pixel values of the four adjacent pixels according to the coordinates for the corresponding pixel and the four adjacent pixels.

8. The image processing device according to claim 6, wherein the stitch unit stitches the first rotated image and the second rotated image along only one stitch line.

9. The image processing device according to claim 8, wherein the stitch line is parallel to long sides of the stitched image.

10. The image processing device according to claim 8, wherein the stitch line passes a center of the stitched image.

* * * * *